United States Patent
Lee et al.

(10) Patent No.: US 11,177,929 B2
(45) Date of Patent: Nov. 16, 2021

(54) METHOD AND APPARATUS FOR ACTIVATING BANDWIDTH PART

(71) Applicant: LG Electronics Inc., Seoul (KR)

(72) Inventors: Youngdae Lee, Seoul (KR); Sangwon Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/635,124

(22) PCT Filed: Sep. 21, 2018

(86) PCT No.: PCT/KR2018/011298
§ 371 (c)(1),
(2) Date: Jan. 29, 2020

(87) PCT Pub. No.: WO2019/059729
PCT Pub. Date: Mar. 28, 2019

(65) Prior Publication Data
US 2020/0235896 A1 Jul. 23, 2020

Related U.S. Application Data

(60) Provisional application No. 62/561,688, filed on Sep. 22, 2017, provisional application No. 62/568,342, filed on Oct. 5, 2017.

(51) Int. Cl.
*H04L 5/00* (2006.01)
*H04W 76/27* (2018.01)
(Continued)

(52) U.S. Cl.
CPC ........ *H04L 5/0098* (2013.01); *H04W 74/004* (2013.01); *H04W 74/0833* (2013.01); *H04W 76/27* (2018.02); *H04W 80/08* (2013.01)

(58) Field of Classification Search
CPC ...... H04L 5/0098; H04L 5/001; H04W 76/27; H04W 74/004; H04W 74/0833; H04W 80/08
See application file for complete search history.

(56) References Cited

U.S. PATENT DOCUMENTS

2015/0146674 A1   5/2015   Krishnamurthy
2019/0045571 A1*  2/2019   Wu .................. H04W 76/15
(Continued)

FOREIGN PATENT DOCUMENTS

EP      3461026        3/2019
EP      3668150        6/2020
WO   WO2011018042    2/2011

OTHER PUBLICATIONS

Huawei, HiSilicon, "Bandwidth part activation and adaptation", R1-1715571, 3GPP TSG RAN WG1 Meeting NR Ad Hoc#3, Nagoya, Japan, Sep. 18-21, 2017, 5 pages.
(Continued)

*Primary Examiner* — Afshawn M Towfighi
(74) *Attorney, Agent, or Firm* — Fish & Richardson P.C.

(57) ABSTRACT

Provided are a method for activating, by a user equipment (UE), a bandwidth part in a wireless communication system. The method may include: activating a first bandwidth part among multiple bandwidth parts; when a problem of the first bandwidth part is detected, deactivating the first bandwidth part; activating a second bandwidth part among the multiple bandwidth parts; and performing uplink transmission to a base station via the activated second bandwidth part.

20 Claims, 13 Drawing Sheets

(51) Int. Cl.
*H04W 74/00* (2009.01)
*H04W 74/08* (2009.01)
*H04W 80/08* (2009.01)

(56) References Cited

U.S. PATENT DOCUMENTS

2019/0199592 A1* 6/2019 Lin .................. H04L 5/0098
2020/0213069 A1* 7/2020 Jiang ................ H04L 5/0053
2020/0228287 A1* 7/2020 Lou .................. H04L 1/0003

OTHER PUBLICATIONS

Interdigital, Inc., "Remaining details of BWP", R1-1716258, 3GPP TSG RAN WG1 Meeting AH_NR#3, Nagoya, Japan, Sep. 18-21, 2017, 6 pages.

LG Electronics, "Discussion on carrier aggregation and bandwidth parts", R1-1715892, 3GPP TSG RAN WG1 Meeting NR#3, Nagoya, Japan, Sep. 18-21, 2017, 12 pages.

ZTE, "Consideration on the RLF and beam failure in NR" R2-1708118, 3GPP TSG-RAN WG2 Meeting #99, Berlin, Germany, Aug. 21-25, 2017, 7 pages.

EP Extended European Search Report in European Appln. No. 18857898.3, dated Mar. 12, 2021, 12 pages.

* cited by examiner

Contiguous BWPs configured for UE

Non-contiguous BWPs configured for UE

METHOD AND APPARATUS FOR ACTIVATING BANDWIDTH PART

CROSS-REFERENCE TO RELATED APPLICATIONS

This application is a National Stage application under 35 U.S.C. § 371 of International Application No. PCT/KR2018/011298, filed on Sep. 21, 2018, which claims the benefit of U.S. Provisional Applications No. 62/561,688 filed on Sep. 22, 2017 and No. 62/568,342 filed on Oct. 5, 2017. The disclosures of the prior applications are incorporated by reference in their entirety.

BACKGROUND OF THE DISCLOSURE

Field of the Disclosure

The present invention relates to a wireless communication system, and more particularly, to a method for a user equipment (UE) to activating or deactivating at least one bandwidth part (BWP) and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

Wide bandwidth (BW) has direct impact on the peak and user experienced data rates. However, since UEs are not always demanding high data rates, the use of wide BW may imply higher idling power consumption both from RF and baseband signal processing perspectives. In this regard, a newly developed concept of BWP for NR provides a means of operating UEs with smaller BW than the configured channel bandwidth (CBW), which makes NR an energy efficient solution despite the support of wideband operation.

Meanwhile, to help to recover from such a DCI lost case, the activation/deactivation of bandwidth part (BWP) by means of timer is introduced. With this mechanism, if a UE is not scheduled for a certain amount of time, i.e., expiration of timer, the UE switches its active BWP to the default one. However, in case of DCI loss or false alarm, the network expects the UE to be in the active DL BWP, but the UE goes to the default BWP, so there is a problem that the UE and the network is not aligned. Thus, a method for a UE to activating or deactivating a BWP and an apparatus supporting the same need to be proposed.

SUMMARY OF THE DISCLOSURE

One embodiment provides a method for activating, by a user equipment (UE), a bandwidth part in a wireless communication system. The method may include: activating a first bandwidth part among multiple bandwidth parts; if a problem of the first bandwidth part is detected, deactivating the first bandwidth part; activating a second bandwidth part among the multiple bandwidth parts; and performing uplink transmission to a base station via the activated second bandwidth part.

Another embodiment provides a user equipment (UE) activating a bandwidth part in a wireless communication system. The UE may include: a memory; a transceiver; and a processor connected with the memory and the transceiver, and configured to: activate a first bandwidth part among multiple bandwidth parts; if a problem of the first bandwidth part is detected, deactivate the first bandwidth part; activate a second bandwidth part among the multiple bandwidth parts; and control the transceiver to perform uplink transmission to a base station via the activated second bandwidth part.

Another embodiment provides a method for activating, by a base station, a bandwidth part in a wireless communication system. The method may include: transmitting a configuration of at least one bandwidth parts with a deactivation timer to a user equipment (UE); after the deactivation timer initiated by the UE is expired and a problem of a first bandwidth part is detected by the UE, receiving a data from the UE via a second bandwidth part, wherein the first bandwidth part is deactivated and the second bandwidth part is activated, when the problem of the first bandwidth part is detected by the UE.

The UE and the network can be aligned to stay same BWP.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
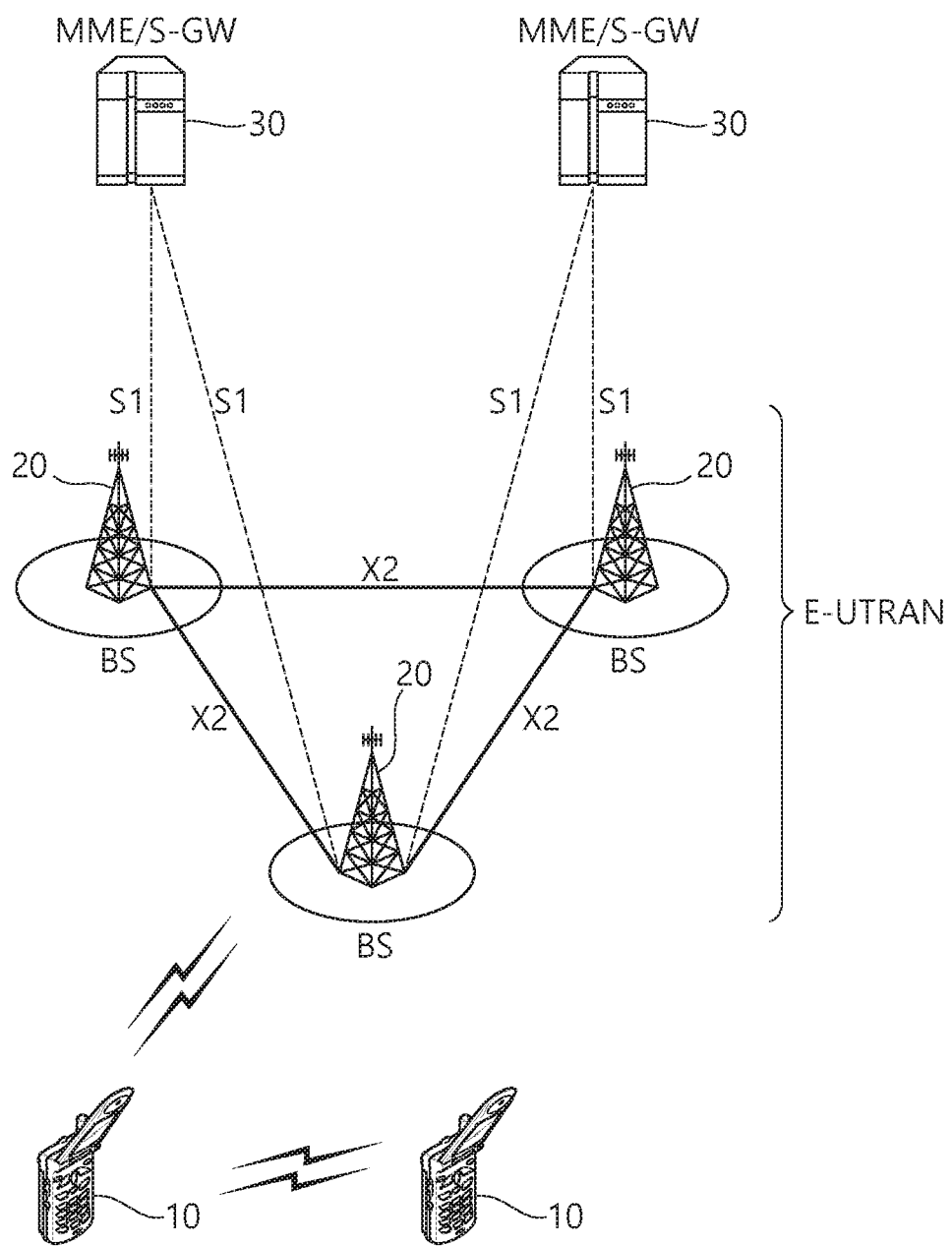
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
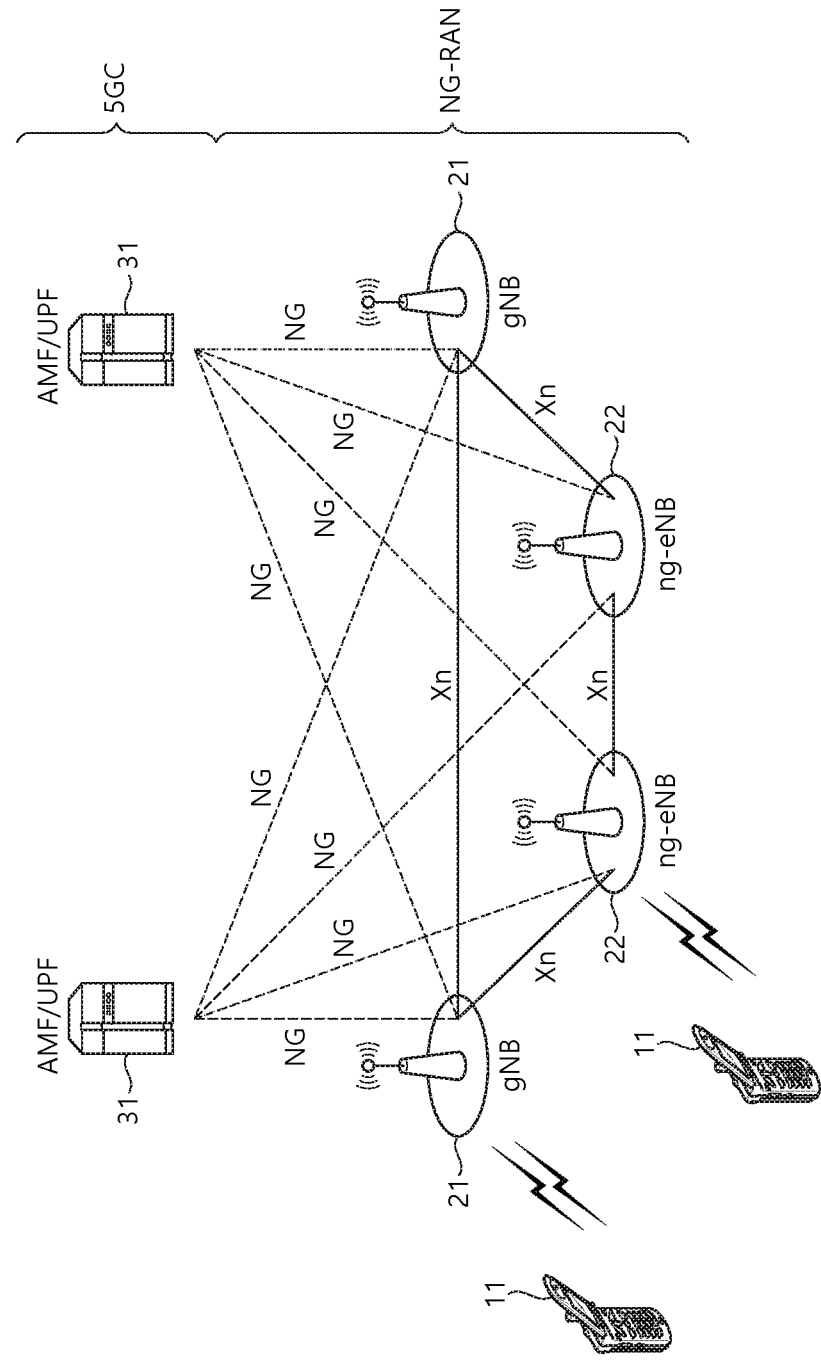
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
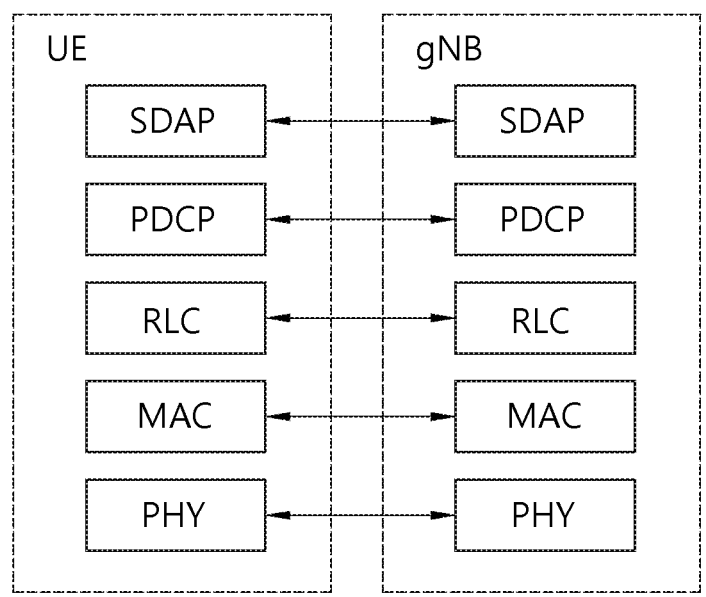
FIG. 3 shows a block diagram of a user plane protocol stack to which technical features of the present invention may be applied.
Figure 4:
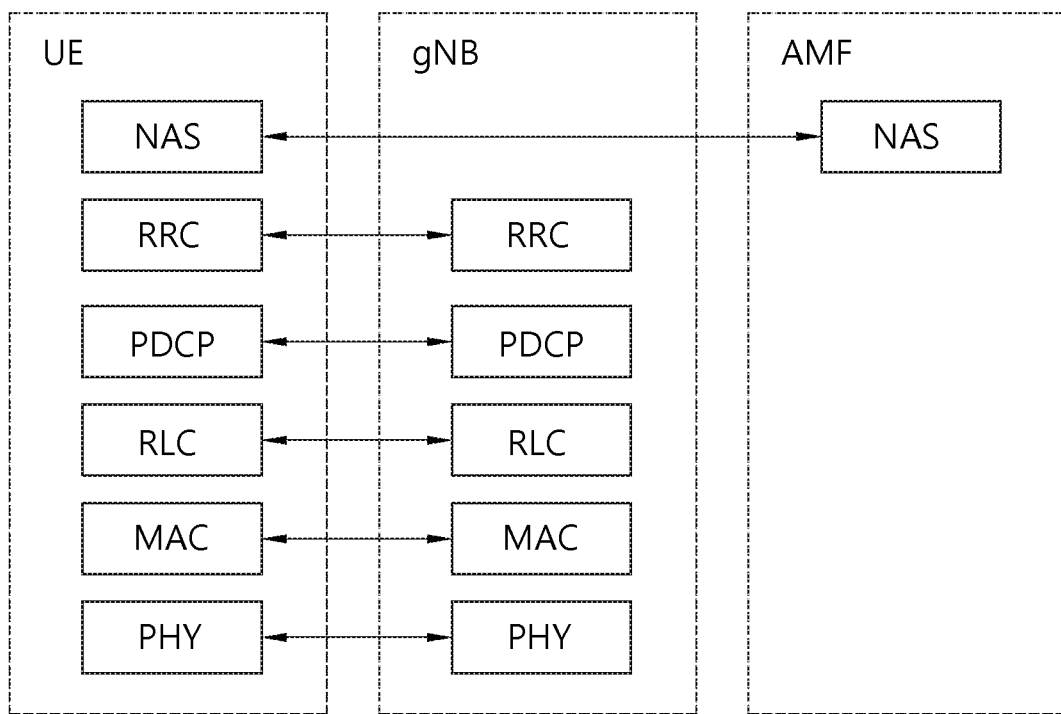
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
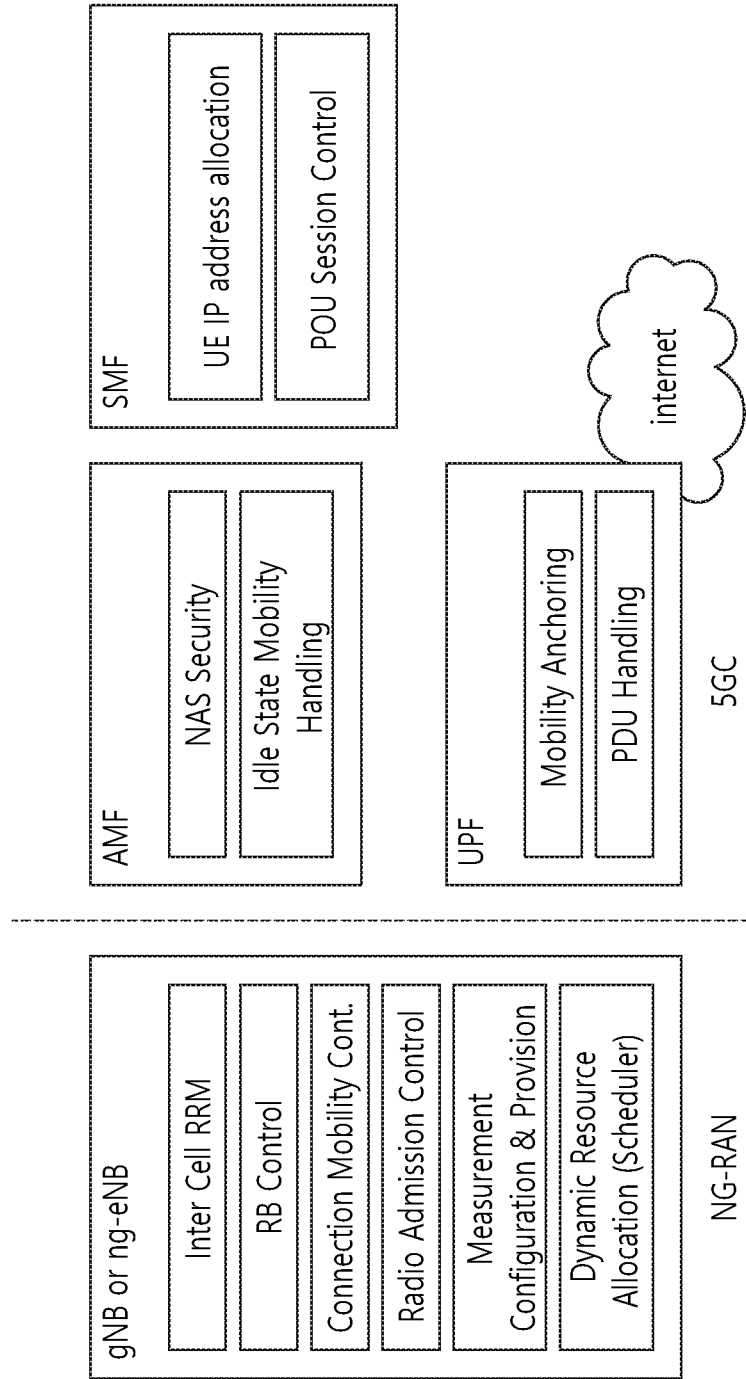
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:
- Functions for Radio Resource Management: Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or O&M);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) may host the following main functions:
- NAS signalling termination;
- NAS signalling security;
- AS Security control;
- Inter CN node signalling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- SMF selection.

The User Plane Function (UPF) may host the following main functions:
- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g. packet filtering, gating, UL/DL rate enforcement;
- Uplink Traffic verification (SDF to QoS flow mapping);
- Downlink packet buffering and downlink data notification triggering.

The Session Management function (SMF) may host the following main functions:
- Session Management;
- UE IP address allocation and management;
- Selection and control of UP function;
- Configures traffic steering at UPF to route traffic to proper destination;
- Control part of policy enforcement and QoS;
- Downlink Data Notification.

Hereinafter, bandwidth part (BWP) is described.

Figure 6:
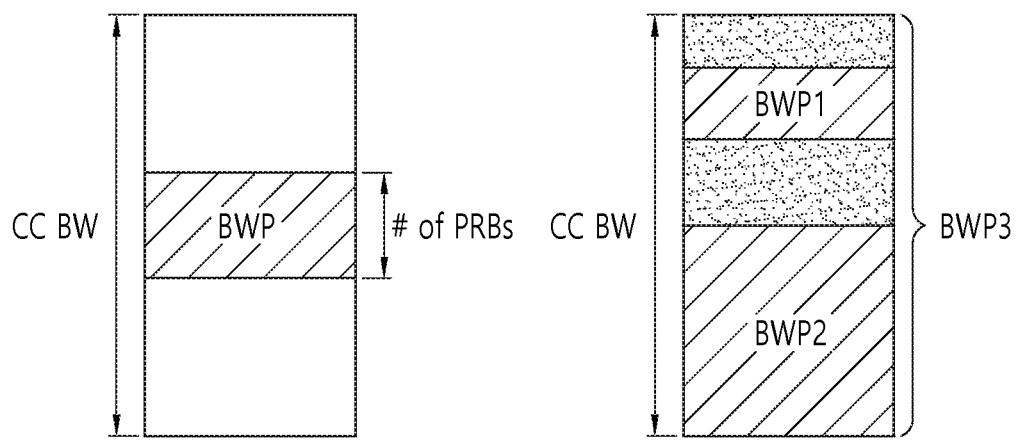
FIG. 6 shows an example of bandwidth part (BWP) configurations to which technical features of the present invention may be applied.

FIG. 6 shows an example of bandwidth part (BWP) configurations to which technical features of the present invention may be applied.

Referring to FIG. 6, a BWP consists of a group of contiguous physical resource blocks (PRBs). The bandwidth (BW) of a BWP cannot exceed the configured component carrier (CC) BW for the UE. The BW of the BWP must be at least as large as one synchronization signal (SS) block BW, but the BWP may or may not contain SS block. Each BWP is associated with a specific numerology, i.e., sub-carrier spacing (SCS) and cyclic prefix (CP) type. Therefore, the BWP is also a means to reconfigure a UE with a certain numerology. As illustrated in the right figure of FIG. 6, the network can configure multiple BWPs to a UE via radio resource control (RRC) signaling, which may overlap in frequency. The granularity of BW configuration is one PRB. For each serving cell, DL and UL BWPs are configured separately and independently for paired spectrum and up to four BWPs can be configured for DL and UL each. For unpaired spectrum, a DL BWP and a UL BWP are jointly configured as a pair and up to 4 pairs can be configured. There can be maximally 4 UL BWPs configured for a supplemental UL (SUL) as well.

Each configured DL BWP includes at least one control resource set (CORESET) with UE-specific search space (USS). The USS is a searching space for UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap. The BWP is also a tool to switch the operating numerology of a UE. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS. On the other hand, it is noted that there is a restriction in the configuration of numerology at least in the early version of NR. That is, the same numerology shall be used within the same PUCCH group including both DL and UL.

Multiple options could be supported for activation/deactivation of BWPs. In addition to the activation/deactivation via dedicated RRC signaling, downlink control information (DCI) based activation/deactivation is supported. On the other hand, the DCI based mechanism, although more prompt than the one based on MAC CE, requires additional consideration for error case handling, i.e., the case when a UE fails to decode the DCI containing the BWP activation/deactivation command. To help to recover from such a DCI lost case, the activation/deactivation of DL BWP (or DL/UL BWP pair for the case of unpaired spectrum) by means of timer is also introduced. With this mechanism, if a UE is not scheduled for a certain amount of time, i.e., expiration of timer, the UE switches its active DL BWP (or DL/UL BWP pair) to the default one. There is an initial active BWP for a UE during the initial access until the UE is explicitly configured with BWPs during or after RRC connection establishment. The initial active BWP is the default BWP, unless configured otherwise. For instance, for a UE, there is at most one active DL BWP and at most one active UL BWP. The HARQ retransmission across different BWPs is supported when a UE's active BWP is switched.

Meanwhile, full bandwidth of a cell can be divided into a number of BWPs. Though the maximum bandwidth that an UE capability supports is less than full bandwidth of a cell, the UE can be served by the cell using only as a partial bandwidth, i.e. BWP. If a cell comprises multiple BWPs and UE measures one BWP at a time, a number of qualities per BWP will be measured for the single cell. For instance, if a cell comprises multiple BWPs and UE does not measure whole BW of the cell at a time, a number of qualities per BWP will be measured for the single cell. Thus, cell quality should be derived even though the measuring is done at BWP level to support handover based on measurement result. Hereinafter, a method for a UE to derive cell quality based on measurement result for at least one BWP and an apparatus supporting the same according to an embodiment of the present invention are described in detail.

Figure 7:
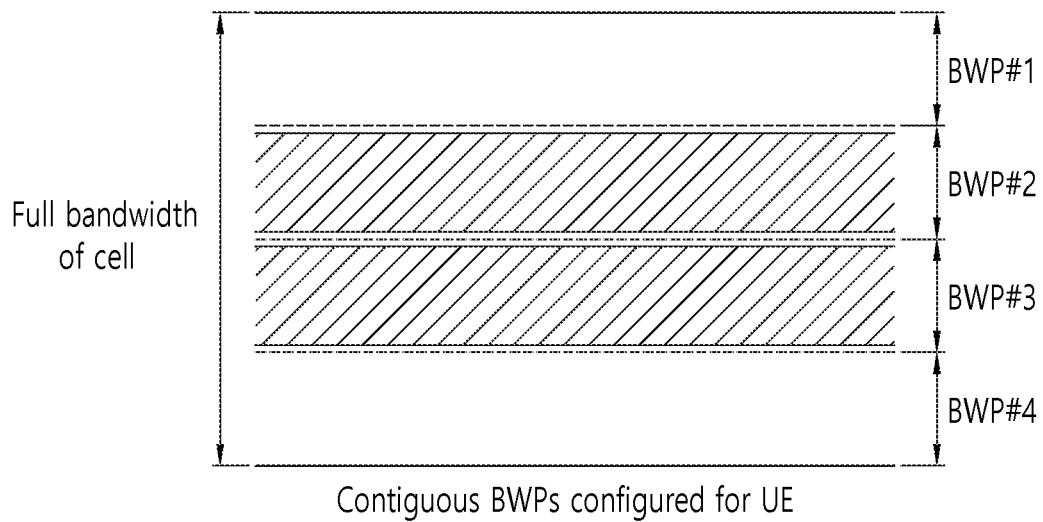
FIG. 7 shows an example of contiguous BWPs and non-contiguous BWPs to which technical features of the present invention may be applied.
Figure 7:
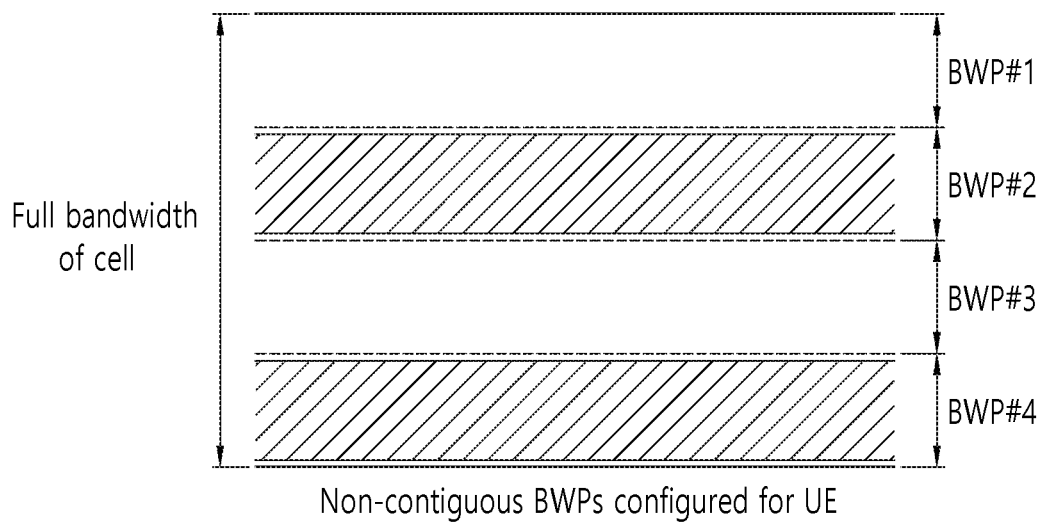

FIG. 7 shows an example of contiguous BWPs and non-contiguous BWPs to which technical features of the present invention may be applied.

Referring to FIG. 7, for serving cell measurements, a UE may be configured with multiple BWPs contiguously or non-contiguously. In order to derive quality of the serving cell, the UE measures only configured BWPs, not all BWPs that belongs to the serving cell. In the present specification, for example, the quality of the serving cell may include at least one of reference signal received power (RSRP), reference signal received quality (RSRQ) and/or signal to interference and noise ratio (SINR). For the serving cell, if multiple BWPs are configured for the UE to measure, the UE may derive the quality of the serving cell based on measurement results of configured BWPs.

Option 1 (Quality of Serving Cell Based on Quality of the Best Configured BWP)

According to an embodiment of the present invention, the UE may measure each configured BWP separately. Then, the UE may select the best BWP based on the measurement results of each BWP, and the UE may consider the measurement results of the best BWP as serving cell quality. For example, it is assumed that two BWPs are configured for SCell #2 and measurement results of each BWP are 24 dB and 28 dB. In this case, the UE may determines that the quality of the SCell #2 is 28 dB.

Option 2 (Quality of Serving Cell Based on Quality of the Best Configured BWP)

According to an embodiment of the present invention, the UE may measure each configured BWP separately. Then, the UE may calculate the average of measurement results of all configured BWPs, and the UE may consider the measurement results of the best BWP as serving cell quality. For example, it is assumed that two BWPs are configured for PCell and measurement results of each BWP are 24 dB and 28 dB. In this case, the UE may determines that the quality of the PCell is 26 dB, which is calculated by (24 dB+28 dB)/2.

Option 3 (Quality of Serving Cell Based on Quality of Primary BWP Configured by Network)

According to an embodiment of the present invention, the UE may be configured with primary BWP by network. Then, the UE may measure the primary BWP, and the UE may consider the measurement results of the primary BWP as serving cell quality.

Option 4 (Quality of Serving Cell Based on Quality of Primary BWP Selected by UE)

According to an embodiment of the present invention, the UE may select the primary BWP among configured BWPs. For instance, the UE may consider the widest BWP among configured BWPs as the primary BWP. If two BWPs (i.e. BWP #1 and BWP #2) are configured for PSCell and BW of BWP #1 and BWP #2 are 5 GHz and 10 GHz, respectively, the UE may consider that BWP #2 (i.e. the widest BWP) is the primary BWP. After selecting the primary BWP, the UE may measure the primary BWP and consider the measurement results of the primary BWP as the serving cell quality.

According to an embodiment of the present invention, the primary BWP may be the BWP that the UE monitors synchronization signals, reference signals (e.g. SS blocks or CSI-RS), system information or paging while in RRC_IDLE, RRC_INACTIVE or RRC_CONNECTED. Also, the primary BWP may be the BWP where the UE performs random access procedure for state transition, e.g. in RRC connection establishment or RRC connection resume.

Further, the UE may use at least one of the options to derive quality of a neighboring cell. Then, for instance, the UE may use the quality of the serving cell and the quality of the neighboring cell to evaluate event-triggering conditions such as A3 event. For instance, the serving cell quality (e.g. RSRP, RSRQ and/or SINR) may be used in following case:

When the UE reports serving cell quality to network via measurement report message.
  When the UE decides whether to measure neighbour cell and/or frequency measurement depending on serving cell quality. For instance, if s-measure is configured and the serving cell quality is higher than the configured s-measure value, the UE does not perform neighbour cell measurement. Else if, the UE performs neighbour cell measurement according to network configuration.

According to an embodiment of the present invention, if multiple BWPs are configured for the UE, the UE can derive the quality of the serving cell by measuring at least one specific BWP.

Meanwhile, to help to recover from such a DCI lost case, the activation/deactivation of DL BWP (or DL/UL BWP pair for the case of unpaired spectrum) by means of timer is introduced. With this mechanism, if a UE is not scheduled for a certain amount of time, i.e., expiration of timer, the UE switches its active DL BWP (or DL/UL BWP pair) to the default one. For instance, if the timer is expired due to no PDCCH activity, the UE goes from wide BWP back to the default (i.e. narrow) DL BWP. In this case, however, the UE and the network could be not aligned to stay the same BWP due to DCI loss or false alarm. For instance, if the UE fails to detect a PDCCH on the active DL BWP even though the network has sent the PDCCH, the UE should switch the active DL BWP to the default one. In this case, the network expects the UE to be in the active DL BWP, but the UE goes to the default BWP, so there is a problem that the UE and the network is not aligned. Hereinafter, a method for a UE to activating or deactivating a BWP and an apparatus supporting the same according to an embodiment of the present invention are described in detail.

In this specification, the BWP may be a cell. The BWP may be a SCell, a PSCell or a PCell. A particular BWP may be a PCell or PSCell. A deactivation timer may be SCell deactivation timer.

Figure 8:
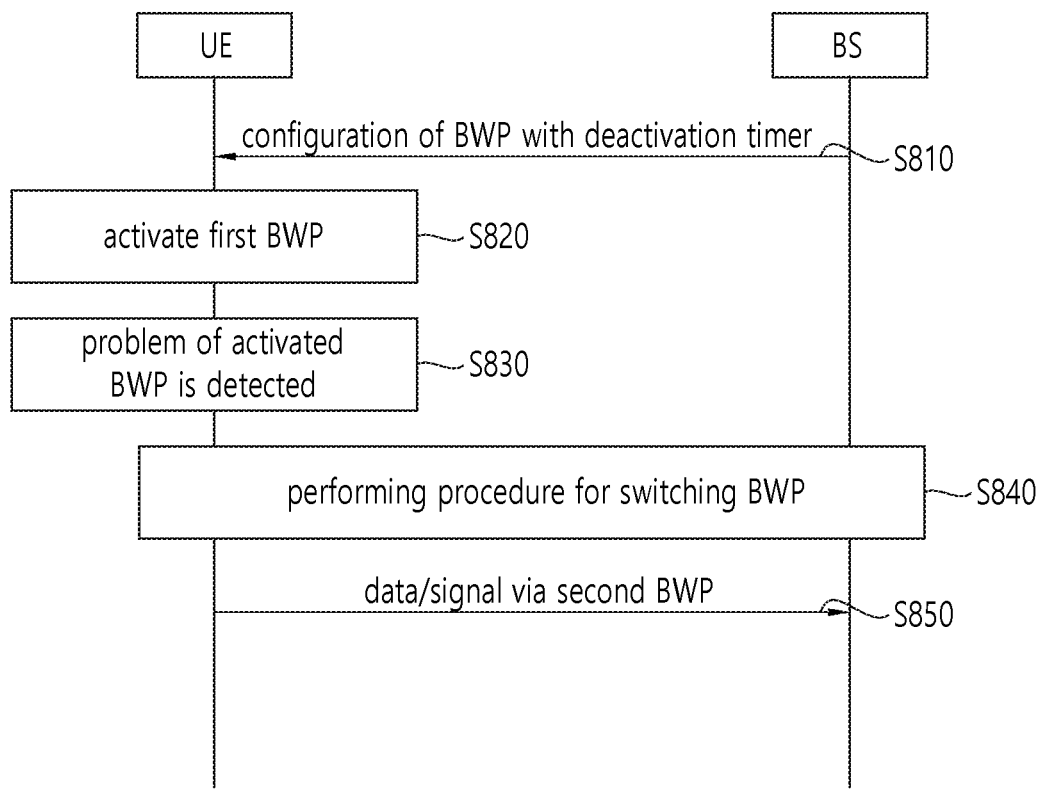
FIG. 8 shows a procedure for activating or deactivating at least one BWP according to an embodiment of the present invention.

FIG. 8 shows a procedure for activating or deactivating at least one BWP according to an embodiment of the present invention.

Referring to FIG. 8, in step S810, a base station may send configuration of 'one or more parts of the carrier bandwidth (i.e. one or more BWPs)' with a deactivation timer to a UE. For instance, the base station may be eNB or gNB. If the UE receives the configuration with the deactivation timer, the UE may configure one or more BWPs.

In step S820, the UE may activate at least one BWP and start the deactivation timer. For instance, the UE may activate a first BWP and start the deactivation timer. If the UE receives a message indicating activation or deactivation of at least one BWP, the UE may re-start the deactivation timer. The message can be carried via at least one of PDCCH, a MAC control element, and/or a RRC message.

In step S830, if the UE detects a problem of activated BWP, the UE may deactivate or de-configure the activated BWP. The problem of activated BWP may be listed as follows.

The deactivation timer is expired, and/or
  One or more out-of-synchronization information/indications on the activated BWP are indicated by a lower layer, and/or
  A random access procedure fails on the activated BWP, and/or
  There is no PDCCH indicating to the UE during a certain duration.

For example, if the deactivation timer is expired, the UE may deactivate or de-configure the activated BWP. For example, if the at least one out-of-synchronization information on the activated BWP is informed to a RRC layer by a physical layer, the UE may deactivate or de-configure the activated BWP. For example, if a random access procedure fails on the activated BWP, the UE may deactivate or de-configure the activated BWP. For example, if the UE does not receive a PDCCH or a DCI during a certain duration, the UE may deactivate or de-configure the activated BWP. For example, if the deactivation timer is expired and a random access procedure fails on the activated BWP, the UE may deactivate or de-configure the activated BWP. For example, if the deactivation timer is expired and the UE does not receive a PDCCH or a DCI during a certain duration, the UE may deactivate or de-configure the activated BWP. Various combinations other than the above-described embodiments may be possible.

In step S840, the UE may perform one or more of the following actions in order to switch from the first BWP to a second BWP (i.e. particular BWP). The second BWP (i.e. particular BWP) may be indicated by the base station via system information or a dedicated signaling. That is, the base station may inform the UE of the second BWP (i.e. particular BWP) via system information or a dedicated signaling. The second BWP (i.e. particular BWP) may be a BWP where the UE performs a RRC connection establishment procedure or a RRC connection resume procedure. The second BWP (i.e. particular BWP) may be a BWP where the UE monitors paging or system information.

The one or more following actions are performed after deactivating BWP. Alternatively, the one or more following actions are performed before deactivating BWP. The one or more following actions may be listed as follows.

The UE may initiate random access procedure. In the random access procedure, the UE may send a random access preamble and/or a message 3 on the second BWP (i.e. particular BWP). In the random access procedure, the UE may send a random access preamble and/or a message 3 on the first BWP (i.e. deactivated BWP).
  The UE may send a message indicating confirmation of the deactivation of the first BWP to the base station. The message may be sent on the second BWP (i.e. particular BWP). The message may be sent on the first BWP (i.e. deactivated BWP). The message may be at least one of uplink control information (UCI) carried on PUCCH, a MAC control element (CE) on PUSCH, a MAC (sub-)header of a MAC PDU, and/or a RRC message on PUSCH. The message may include one or more of a BWP index indicating to the first BWP (i.e. deactivated BWP), a BWP index indicating to the second BWP (i.e. particular BWP), a cause indicating expiry of the deactivation timer, and/or a confirmation of deactivation of the first BWP.

The UE may initiate scheduling request procedure. In the scheduling request procedure, the UE may send scheduling request (SR) on PUCCH on the second BWP (i.e. particular BWP). In the scheduling request procedure, the UE may send scheduling request (SR) on PUCCH on the first BWP (i.e. deactivated BWP).

The UE may initiate a RRC connection re-establishment procedure. In the RRC connection re-establishment procedure, the UE may select a cell and perform a random access at the selected cell. In this case, UE may perform the random access at the second BWP (i.e. particular BWP) of the selected cell. The first BWP (i.e. deactivated BWP) may be configured at either a secondary cell group (SCG) cell or a master cell group (MCG) cell. The second BWP (i.e. particular BWP) may be configured at either a secondary cell group (SCG) cell or a master cell group (MCG) cell. For instance, the SCG cell may be PSCell, and the MCG cell may be PCell.

The UE may initiate a SCG failure information procedure. In the SCG failure information procedure, the UE may send SCG failure information message to a master base station or a secondary base station. For instance, the master base station may include MeNB or MgNB, and the secondary base station may include SeNB or SgNB. The SCG failure information may include one or more of a BWP index indicating to the first BWP (i.e. deactivated BWP), a BWP index indicating to the second BWP (i.e. particular BWP), a cause indicating expiry of the deactivation timer, and/or a confirmation of deactivation of the first BWP. The first BWP (i.e. deactivated BWP) may be configured at either a secondary cell group (SCG) cell. The second BWP (i.e. particular BWP) may be configured at either a secondary cell group (SCG) cell or a master cell group (MCG) cell. For instance, the SCG cell may be PSCell, and the MCG cell may be PCell.

The UE may activate the second BWP (i.e. particular BWP).

The UE may apply configuration of the first BWP (i.e. deactivated BWP) to the second BWP (i.e. particular BWP). That is, the UE may configure the second BWP (i.e. particular BWP) by using the configuration of the first BWP (i.e. deactivated BWP). The configuration may be at least one of discontinuous reception (DRX) configuration, sounding reference signal (SRS) configuration, semi persistent scheduling (SPS) configuration, MAC configuration, RLC configuration, PDCP configuration, and/or PUCCH configuration.

In step S850, the UE may monitor the second BWP (i.e. particular BWP). Further, the UE may perform uplink transmission to the base station via the activated second BWP.

Figure 9:
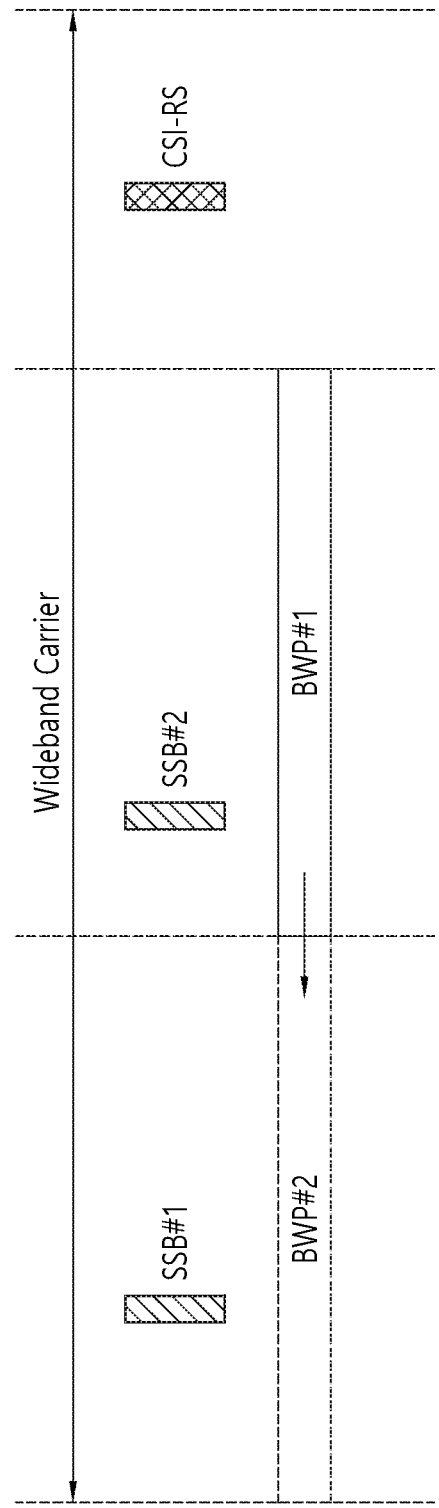
FIG. 9 shows an example of BWP switching according to an embodiment of the present invention.

FIG. 9 shows an example of BWP switching according to an embodiment of the present invention.

Referring to FIG. 9, the UE may switch BWP #1 to BWP #2. The BWP switching may be performed according to the procedure described in FIG. 8.

Figure 10:
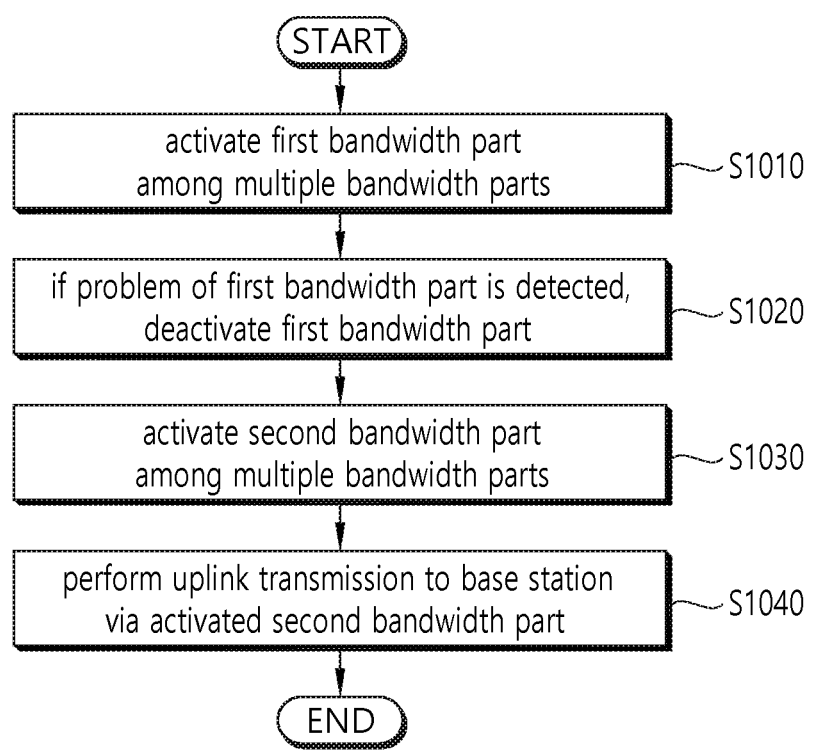
FIG. 10 shows a method for activating or deactivating at least one BWP by a UE according to an embodiment of the present invention.

FIG. 10 shows a method for activating or deactivating at least one BWP by a UE according to an embodiment of the present invention. The present invention described above for UE side may be applied to this embodiment.

Referring to FIG. 10, in step S1010, the UE may activate a first bandwidth part among multiple bandwidth parts.

In step S1020, if a problem of the first bandwidth part is detected, the UE may deactivate the first bandwidth part.

The problem of the first bandwidth part may be that at least one out-of-synchronization information on the first bandwidth part is informed to an upper layer of the UE by a lower layer of the UE. The upper layer may include a radio resource control (RRC) layer, and the lower layer includes a physical (PHY) layer or a media access control (MAC) layer. The problem of the first bandwidth part may be that a random access procedure fails on the first bandwidth part. The problem of the first bandwidth part may be that the UE does not receive PDCCH during a certain duration.

In step S1030, the UE may activate a second bandwidth part among the multiple bandwidth parts. The second bandwidth part may be a bandwidth part where the UE performs a RRC connection establishment procedure or a RRC connection resume, or a bandwidth part where the UE monitors a paging or system information. The second bandwidth part may be informed by the base station via system information or a dedicated signaling.

In step S1040, the UE may perform uplink transmission to a base station via the activated second bandwidth part.

Further, the UE may transmit a random access preamble via the first bandwidth part to the base station if the problem of the first bandwidth part is detected. Further, the UE may transmit a random access preamble via the second bandwidth part to the base station if the problem of the first bandwidth part is detected.

Further, the UE may transmit a message including a confirmation of deactivation of the first bandwidth part via the first bandwidth part to the base station if the problem of the first bandwidth part is detected. Further, the UE may transmit a message including a confirmation of deactivation of the first bandwidth part via the second bandwidth part to the base station if the problem of the first bandwidth part is detected. The message may include at least one of an index of the first bandwidth part, an index of the second bandwidth part, and/or a cause of expiration of a deactivation timer.

Further, the UE may initiate a RRC re-establishment procedure to select a cell if the problem of the first bandwidth part is detected, wherein the second bandwidth part is activated among bandwidth parts of the cell.

According to an embodiment of the present invention, the UE and the network could be aligned to stay the same BWP due to DCI loss or false alarm. For instance, if the UE fails to detect a PDCCH on the active DL BWP even though the network has sent the PDCCH, the UE should switch the active DL BWP to the particular BWP. In this case, the UE can perform the proposed procedure according to an embodiment of the present invention, so that the network and the UE can be aligned to stay the same BWP regardless of DCI loss or false alarm. Also, according to an embodiment of the present invention, when a problem occurs in a specific BWP, the UE can perform operations in another BWP.

Figure 11:
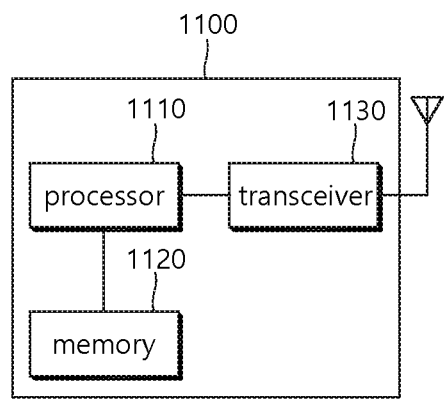
FIG. 11 shows a UE to implement an embodiment of the present invention.

FIG. 11 shows a UE to implement an embodiment of the present invention. The present invention described above for UE side may be applied to this embodiment.

A UE 1100 includes a processor 1110, a memory 1120 and a transceiver 1130. The processor 1110 may be configured to implement proposed functions, procedures and/or methods described in this description. Layers of the radio interface protocol may be implemented in the processor 1110.

Specifically, the processor 1110 may activate a first bandwidth part among multiple bandwidth parts.

Further, when a problem of the first bandwidth part is detected, the processor 1110 may deactivate the first bandwidth part. The problem of the first bandwidth part may be that at least one out-of-synchronization information on the first bandwidth part is informed to an upper layer of the UE by a lower layer of the UE. The upper layer may include a radio resource control (RRC) layer, and the lower layer includes a physical (PHY) layer or a media access control (MAC) layer. The problem of the first bandwidth part may be that a random access procedure fails on the first bandwidth part. The problem of the first bandwidth part may be that the UE does not receive PDCCH during a certain duration.

Further, the processor 1110 may activate a second bandwidth part among the multiple bandwidth parts. The second bandwidth part may be a bandwidth part where the UE performs a RRC connection establishment procedure or a RRC connection resume, or a bandwidth part where the UE monitors a paging or system information. The second bandwidth part may be informed by the base station via system information or a dedicated signaling.

Further, the processor 1110 may control the transceiver 1130 to perform uplink transmission to a base station via the activated second bandwidth part.

Further, the processor 1110 may control the transceiver 1130 to transmit a random access preamble via the first bandwidth part to the base station when the problem of the first bandwidth part is detected. Further, the processor 1110 may control the transceiver 1130 to transmit a random access preamble via the second bandwidth part to the base station when the problem of the first bandwidth part is detected.

Further, the processor 1110 may control the transceiver 1130 to transmit a message including a confirmation of deactivation of the first bandwidth part via the first bandwidth part to the base station when the problem of the first bandwidth part is detected. Further, the processor 1110 may control the transceiver 1130 to transmit a message including a confirmation of deactivation of the first bandwidth part via the second bandwidth part to the base station when the problem of the first bandwidth part is detected. The message may include at least one of an index of the first bandwidth part, an index of the second bandwidth part, and/or a cause of expiration of a deactivation timer.

Further, the processor 1110 may initiate a RRC re-establishment procedure to select a cell when the problem of the first bandwidth part is detected, wherein the second bandwidth part is activated among bandwidth parts of the cell.

The memory 1120 is operatively coupled with the processor 1110 and stores a variety of information to operate the processor 1110. The transceiver 1120 is operatively coupled with the processor 1110, and transmits and/or receives a radio signal.

Figure 12:
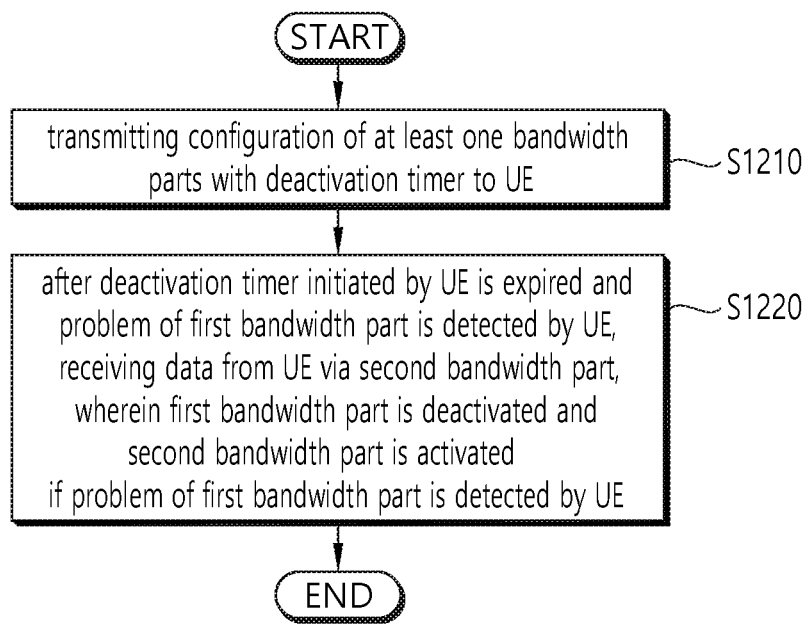
FIG. 12 shows a method for activating or deactivating at least one BWP by a BS according to an embodiment of the present invention.

FIG. 12 shows a method for activating or deactivating at least one BWP by a BS according to an embodiment of the present invention. The present invention described above for BS side may be applied to this embodiment.

Referring to FIG. 12, in step S1210, the BS may transmit a configuration of at least one bandwidth parts with a deactivation timer to a UE.

In step S1220, the BS may receive a data from the UE via a second bandwidth part, after the deactivation timer initiated by the UE is expired and a problem of a first bandwidth part is detected by the UE. The first bandwidth part may be deactivated and the second bandwidth part may be activated, when the problem of the first bandwidth part is detected by the UE. The problem of the first bandwidth part may be that at least one out-of-synchronization information on the first bandwidth part is informed to an upper layer of the UE by a lower layer of the UE. The upper layer may include a radio resource control (RRC) layer, and the lower layer includes a physical (PHY) layer or a media access control (MAC) layer. The problem of the first bandwidth part may be that a random access procedure fails on the first bandwidth part. The problem of the first bandwidth part may be that the UE does not receive PDCCH during a certain duration. The second bandwidth part may be a bandwidth part where the UE performs a RRC connection establishment procedure or a RRC connection resume, or a bandwidth part where the UE monitors a paging or system information. The second bandwidth part may be informed by the base station via system information or a dedicated signaling.

Further, the BS may receive a random access preamble via the first bandwidth part from the UE when the problem of the first bandwidth part is detected. Further, the BS may receive a random access preamble via the second bandwidth part from the UE when the problem of the first bandwidth part is detected.

Further, the BS may receive a message including a confirmation of deactivation of the first bandwidth part via the first bandwidth part from the UE when the problem of the first bandwidth part is detected. Further, the BS may receive a message including a confirmation of deactivation of the first bandwidth part via the second bandwidth part from the UE when the problem of the first bandwidth part is detected. The message may include at least one of an index of the first bandwidth part, an index of the second bandwidth part, and/or a cause of expiration of a deactivation timer.

Figure 13:
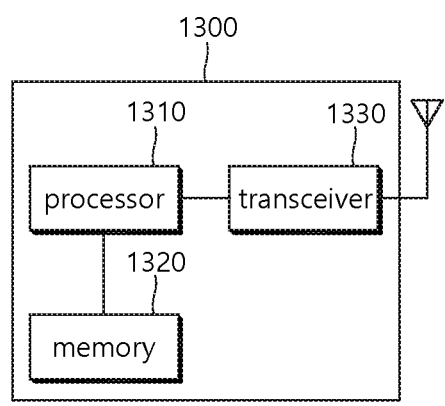
FIG. 13 shows a BS to implement an embodiment of the present invention.

FIG. 13 shows a BS to implement an embodiment of the present invention. The present invention described above for BS side may be applied to this embodiment.

A BS 1300 includes a processor 1310, a memory 1320 and a transceiver 1330. The processor 1310 may be configured to implement proposed functions, procedures and/or methods described in this description. Layers of the radio interface protocol may be implemented in the processor 1310.

Specifically, the processor 1310 may control the transceiver 1330 to transmit a configuration of at least one bandwidth parts with a deactivation timer to a UE.

Further, the processor 1310 may control the transceiver 1330 to receive a data from the UE via a second bandwidth part, after the deactivation timer initiated by the UE is expired and a problem of a first bandwidth part is detected by the UE. The first bandwidth part may be deactivated and the second bandwidth part may be activated, when the problem of the first bandwidth part is detected by the UE. The problem of the first bandwidth part may be that at least one out-of-synchronization information on the first bandwidth part is informed to an upper layer of the UE by a lower layer of the UE. The upper layer may include a radio resource control (RRC) layer, and the lower layer includes a physical (PHY) layer or a media access control (MAC) layer. The problem of the first bandwidth part may be that a random access procedure fails on the first bandwidth part. The problem of the first bandwidth part may be that the UE does not receive PDCCH during a certain duration. The second bandwidth part may be a bandwidth part where the UE performs a RRC connection establishment procedure or a RRC connection resume, or a bandwidth part where the UE monitors a paging or system information. The second bandwidth part may be informed by the base station via system information or a dedicated signaling.

Further, the processor 1310 may control the transceiver 1330 to receive a random access preamble via the first bandwidth part from the UE when the problem of the first bandwidth part is detected. Further, the BS may receive a random access preamble via the second bandwidth part from the UE when the problem of the first bandwidth part is detected.

Further, the processor 1310 may control the transceiver 1330 to receive a message including a confirmation of deactivation of the first bandwidth part via the first bandwidth part from the UE when the problem of the first bandwidth part is detected. Further, the processor 1310 may control the transceiver 1330 to receive a message including a confirmation of deactivation of the first bandwidth part via the second bandwidth part from the UE when the problem of the first bandwidth part is detected. The message may include at least one of an index of the first bandwidth part, an index of the second bandwidth part, and/or a cause of expiration of a deactivation timer.

The memory 1320 is operatively coupled with the processor 1310 and stores a variety of information to operate the processor 1310. The transceiver 1330 is operatively coupled with the processor 1310, and transmits and/or receives a radio signal.

The processor 1110, 1310 may include an application-specific integrated circuit (ASIC), a separate chipset, a logic circuit, and/or a data processing unit. The memory 1120, 1320 may include a read-only memory (ROM), a random access memory (RAM), a flash memory, a memory card, a storage medium, and/or other equivalent storage devices. The transceiver 1130, 1330 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1110, 1310. The memory 1120, 1320 may be located inside or outside the processor 1110, 1310, and may be coupled to the processor 1110, 1310 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for activating, by a user equipment (UE), a bandwidth part in a wireless communication system, the method comprising:
    activating a first bandwidth part among multiple bandwidth parts;
    based on a problem of the first bandwidth part being detected, deactivating the first bandwidth part;
    transmitting, to a base station, a message for confirming deactivation of the first bandwidth part, wherein the message includes at least one of an index of the first bandwidth part, an index of a second bandwidth part, or a cause of expiration of a deactivation timer;
    activating the second bandwidth part among the multiple bandwidth parts; and
    performing uplink transmission to the base station via the activated second bandwidth part.

2. The method of claim 1, wherein the problem of the first bandwidth part is that at least one out-of-synchronization information on the first bandwidth part is informed to an upper layer of the UE by a lower layer of the UE.

3. The method of claim 2, wherein the upper layer includes a radio resource control (RRC) layer, and the lower layer includes a physical (PHY) layer or a media access control (MAC) layer.

4. The method of claim 1, wherein the problem of the first bandwidth part is that a random access procedure fails on the first bandwidth part.

5. The method of claim 1, wherein the problem of the first bandwidth part is that the UE does not receive PDCCH during a certain duration.

6. The method of claim 1, further comprising:
    based on the problem of the first bandwidth part being detected, transmitting a random access preamble via the first bandwidth part, to the base station.

7. The method of claim 1, further comprising:
    based on the problem of the first bandwidth part being detected, transmitting a random access preamble via the second bandwidth part, to the base station.

8. The method of claim 1, wherein, based on the problem of the first bandwidth part being detected, the message is transmitted to the base station via the first bandwidth part.

9. The method of claim 1, wherein, based on the problem of the first bandwidth part being detected, the message is transmitted to the base station via the second bandwidth part.

10. The method of claim 1, further comprising:
    based on the problem of the first bandwidth part being detected, initiating a RRC re-establishment procedure to select a cell,
    wherein the second bandwidth part is activated among bandwidth parts of the cell.

11. The method of claim 1, wherein the second bandwidth part is a bandwidth part in which the UE performs a RRC connection establishment procedure or a RRC connection resume, or a bandwidth part in which the UE monitors a paging or system information.

12. The method of claim 1, wherein the second bandwidth part is informed by the base station via system information or a dedicated signaling.

13. The method of claim 1, wherein the UE communicates with at least one of a mobile terminal, a network or autonomous vehicles other than the UE.

14. A user equipment (UE) configured to activate a bandwidth part in a wireless communication system, the UE comprising:
    a transceiver;
    at least one processor; and
    at least one computer-readable memory storing instructions that, based on being executed by the at least one processor, control the UE to perform operations comprising:
    activating a first bandwidth part among multiple bandwidth parts;
    based on a problem of the first bandwidth part being detected, deactivating the first bandwidth part;
    transmitting, to a base station via the transceiver, a message for confirming deactivation of the first bandwidth part, wherein the message includes at least one of an index of the first bandwidth part, an index of a second bandwidth part, or a cause of expiration of a deactivation timer;
    activating the second bandwidth part among the multiple bandwidth parts; and performing uplink transmission to the base station via the activated second bandwidth part.

15. The UE of claim 14, wherein the problem of the first bandwidth part is that at least one out-of-synchronization information on the first bandwidth part is informed to an upper layer of the UE by a lower layer of the UE.

16. The UE of claim 14, wherein the problem of the first bandwidth part is that a random access procedure fails on the first bandwidth part.

17. The UE of claim 14, wherein the problem of the first bandwidth part is that the UE does not receive PDCCH during a certain duration.

18. The UE of claim 14, wherein, based on the problem of the first bandwidth part being detected, the message is transmitted to the base station via the first bandwidth part.

19. The UE of claim 14, wherein, based on the problem of the first bandwidth part being detected, the message is transmitted to the base station via the second bandwidth part.

20. A method for activating, by a base station (B S), a bandwidth part in a wireless communication system, the method comprising:
transmitting a configuration of at least one bandwidth parts with a deactivation timer to a user equipment (UE); and
after the deactivation timer initiated by the UE is expired and a problem of a first bandwidth part is detected by the UE, receiving a data from the UE via a second bandwidth part,
wherein the first bandwidth part is deactivated and the second bandwidth part is activated, based on the problem of the first bandwidth part being detected by the UE.

* * * * *